(12) United States Patent
Xue

(10) Patent No.: US 12,727,577 B1
(45) Date of Patent: Sep. 8, 2026

(54) PET FEEDER

(71) Applicant: Dongguan ZhiYiHong Hardware & Plastic Co., Ltd., Dongguan (CN)

(72) Inventor: Zhiqi Xue, Dongguan (CN)

(73) Assignee: Dongguan ZhiYHong Hardware & Plastic Co., Ltd., Dongguan (CN)

( * ) Notice: Subject to any disclaimer, the term of this patent is extended or adjusted under 35 U.S.C. 154(b) by 0 days.

(21) Appl. No.: 19/335,132

(22) Filed: Sep. 22, 2025

(51) Int. Cl.
*A01K 5/01* (2006.01)
*A01K 5/02* (2006.01)

(52) U.S. Cl.
CPC .......... *A01K 5/0114* (2013.01); *A01K 5/0258* (2013.01)

(58) Field of Classification Search
CPC ............................ A01K 5/0114; A01K 5/0258
See application file for complete search history.

(56) References Cited

U.S. PATENT DOCUMENTS 2,987,040 A * 6/1961 Piel ...................... A01K 5/0258 119/57.2
3,353,654 A * 11/1967 Ferris ...................... A01K 5/00 198/671
5,363,805 A * 11/1994 Wing .................. A01K 5/0291 119/51.11
9,560,834 B2 2/2017 Ma
11,744,226 B2 9/2023 Tsal et al.
12,022,809 B2 7/2024 Qiu
12,382,924 B1 * 8/2025 Anthenat ............. A01K 5/0275
2005/0217591 A1 * 10/2005 Turner ................. A01K 5/0114 119/51.02
2011/0174224 A1 * 7/2011 Brooks ................ A01K 5/0275 119/57.92
2013/0055956 A1 * 3/2013 Coxsey ................ A01K 5/0225 119/51.11
2014/0224179 A1 * 8/2014 Mignone ................ A01K 61/80 119/57.92
2017/0295750 A1 * 10/2017 Trottier ................ A01K 5/0114
2021/0000069 A1 * 1/2021 Veness ................. A01K 5/0258
2022/0079115 A1 * 3/2022 Tsai ..................... A01K 5/0258
2025/0160383 A1 * 5/2025 Ming .................. A01K 5/0114

(Continued)

FOREIGN PATENT DOCUMENTS

CN 112056234 A * 12/2020 ........... A01K 5/0114
CN 219500188 U * 8/2023

(Continued)

*Primary Examiner* — Monica L Perry
*Assistant Examiner* — Aaron M Rodziwicz
(74) *Attorney, Agent, or Firm* — Ricky Lam

(57) ABSTRACT

A pet feeder includes a base, a food tank and a driving mechanism; the driving mechanism is fixedly connected to the base and movably connected to outer circumferential wall of the food tank, and is used for supporting the food tank and driving the food tank to rotate; a food discharging assembly is arranged in the food tank; when the driving mechanism drives the food tank to rotate, pet foods in the food tank can be outputted to outside of the food tank by the food discharging assembly. The driving mechanism drives the food tank to rotate; rotation of the food tank is accompanied with food output, thus foods in the food tank can be overturned and mixed with each discharging, which avoids problems of sticking and caking and unsmooth discharging of foods at inner top of the food tank of an existing pet feeder due to long-term standing.

20 Claims, 7 Drawing Sheets

(56) References Cited

U.S. PATENT DOCUMENTS

| | | | | |
|---|---|---|---|---|
| 2026/0026466 | A1* | 1/2026 | Song | A01K 5/0114 |
| 2026/0026468 | A1* | 1/2026 | Song | A01K 5/0258 |
| 2026/0026469 | A1* | 1/2026 | Song | A01K 5/0258 |

FOREIGN PATENT DOCUMENTS

| | | | | | |
|---|---|---|---|---|---|
| CN | 219500189 | U | * | 8/2023 | |
| CN | 219500190 | U | * | 8/2023 | |
| GB | 2231767 | A | * | 11/1990 | A01K 61/80 |
| KR | 20090080836 | A | * | 7/2009 | A01K 5/0291 |
| KR | 101321953 | B1 | * | 10/2013 | A01K 5/0114 |
| KR | 20210072546 | A | * | 6/2021 | A01K 5/025 |
| KR | 20220109574 | A | * | 8/2022 | H04N 7/18 |
| KR | 20250169738 | A | * | 12/2025 | A01K 5/0283 |
| WO | WO-2016033462 | A1 | * | 3/2016 | A01K 15/02 |
| WO | WO-2025113490 | A1 | * | 6/2025 | A01K 5/02 |

* cited by examiner

PET FEEDER

FIELD OF THE INVENTION

The present application relates to the technical field of pet supplies, and specifically relates to a pet feeder.

BACKGROUND OF THE INVENTION

Pet feeders provided by existing technology typically feed foods directly from the bottom of food tanks, namely, the foods fed each time are discharged from the bottom, while the foods at the top of the food tanks are fed at the last. Although most existing pet feeders have lids on the food tanks, in regions with damp climates or during rainy season, long-term standing conditions will still cause the foods at the top to food tanks sticking and caking, resulting in problems that the foods at this part cannot be discharged smoothly or block food outlets.

Therefore, it is necessary to propose a novel technical solution to solve the above technical issues.

SUMMARY OF THE INVENTION

An objective of the present application provides a pet feeder, which solves the problems that foods in the pet feeder are stunk and caked and cannot be smoothly discharged.

To solve above problems, the technical solutions in the present application are as follows:

the pet feeder provided by the present application includes:

a base;

a food tank having a cavity for accommodating pet foods; and a driving mechanism which is fixedly connected to the base and movably connected to an outer circumferential wall of the food tank, and is used for supporting the food tank and driving the food tank to rotate;

a food discharging assembly is arranged in the food tank; and when the driving mechanism drives the food tank to rotate, pet foods in the food tank can be outputted to the outside of the food tank by the food discharging assembly.

Further, the food discharging assembly includes a food discharging rail and a food outlet formed in the outer circumferential wall of the food tank, and the interior of the food tank communicates with the exterior of the food tank through the food outlet and the food discharging rail.

Further, the food discharging rail includes a sliding portion connected to the food outlet and a guide portion connected to the other end of the sliding portion, and an opening communicating with the cavity in the food tank is formed in the end, away from the sliding portion, of the guide portion.

Further, an included angle formed between the guide portion and the sliding portion is not larger than 90°.

Further, the food feeder further includes a food collecting flap, the food collecting flap is fixed to the inner circumferential wall of the food tank, and one end of the food collecting flap is close to the opening of the guide portion.

Further, the food tank includes a first panel and a second panel which are oppositely arranged, and a third panel which fixedly connects the first panel with the second panel; and the third panel is configured to be of a hollow cylindrical structure with two ends opened;

the food discharging assembly is fixedly connected to the first panel, and the food outlet is formed in the first panel; and one end of the food collecting flap is fixedly connected to the second panel, the other end of the food collecting flap is formed by extending the second panel towards the first panel, and the other end of the food collecting flap is close to the opening of the guide portion.

Further, the food collecting flap is fixedly connected to the third panel.

Further, the food discharging rail is defined by a first rail member, a second rail member and the inner wall of the food tank.

Further, the driving mechanism includes a driving motor and a linkage assembly, in which, the food tank is movably connected to the linkage assembly, and the driving motor drives the linkage assembly to rotate the food tank that is movably connected to the linkage assembly.

Further, the linkage assembly includes a fixing frame fixedly connected to the base, and a first transmission member and a second transmission member which are arranged on the fixing frame; the first transmission member is connected to the driving motor, and the second transmission member is synchronously connected to the first transmission member and the outer circumferential wall of the food tank; and the driving motor drives the food tank to rotate by the first transmission member and the second transmission member.

Further, the first transmission member includes a transmission gear set connected to an output shaft of the driving motor and a transmission shaft fixedly connected to the transmission gear set; the second transmission member sleeves the transmission shaft in a fixed connection way; and the outer circumferential wall of the food tank is movably connected to the second transmission member.

Further, the second transmission member includes at least two oppositely-arranged transmission wheels which sleeve the transmission shaft and can rotate along with the transmission shaft; and the food tank is movably connected to the transmission wheels.

Further, each transmission wheel is provided with a connecting portion that abuts against the outer circumferential wall of the food tank, and a limiting portion that is connected to the outer side of the connecting portion.

Further, the diameter of the connecting portions is less than that of the limiting portions.

Further, the outer circumferential wall of the food tank is in friction transmission connection with the transmission wheels.

Further, the outer circumferential wall of the food tank is provided with meshing tooth structures which are matched the transmission wheels.

Further, the base includes a base bottom plate and a fixing cover which packages the top of the base bottom plate, and an accommodating space used for accommodating the driving mechanism is defined by the base bottom plate and the fixing cover; and an accommodating groove that is sunken towards the base bottom plate is formed in the top of the fixing cover, and the accommodating groove is configured to be matched with an outer edge of the bottom of the food tank.

Further, a linkage hole is formed in the accommodating groove and corresponds to the transmission wheels; and after the fixing cover packages the base bottom plate, the transmission wheels partially protrude out of the linkage hole so as to make the transmission wheels abut against the food tank when the food tank is in the accommodating groove.

Further, the pet feeder further includes a food bowl which is arranged adjacent to the base, and an opening of the food bowl is located below the food outlet.

Further, a concave portion matched with outer edge of the food bowl by radian is arranged on the side, facing the food bowl, of the base, and the food bowl is embedded in the concave portion.

Compared with related technology, the present application has the beneficial effects that in the present application, the driving mechanism is arranged to drive the food tank to rotate, the rotation of the food tank is accompanied with food output, the food tank rotates with each discharging, thus the pet foods in the food tank can be overturned and mixed with each discharging, which avoids problems of sticking and caking and unsmooth discharging of the foods at inner top of the food tank of the pet feeder due to long-term standing in the related technology.

Figure 1:
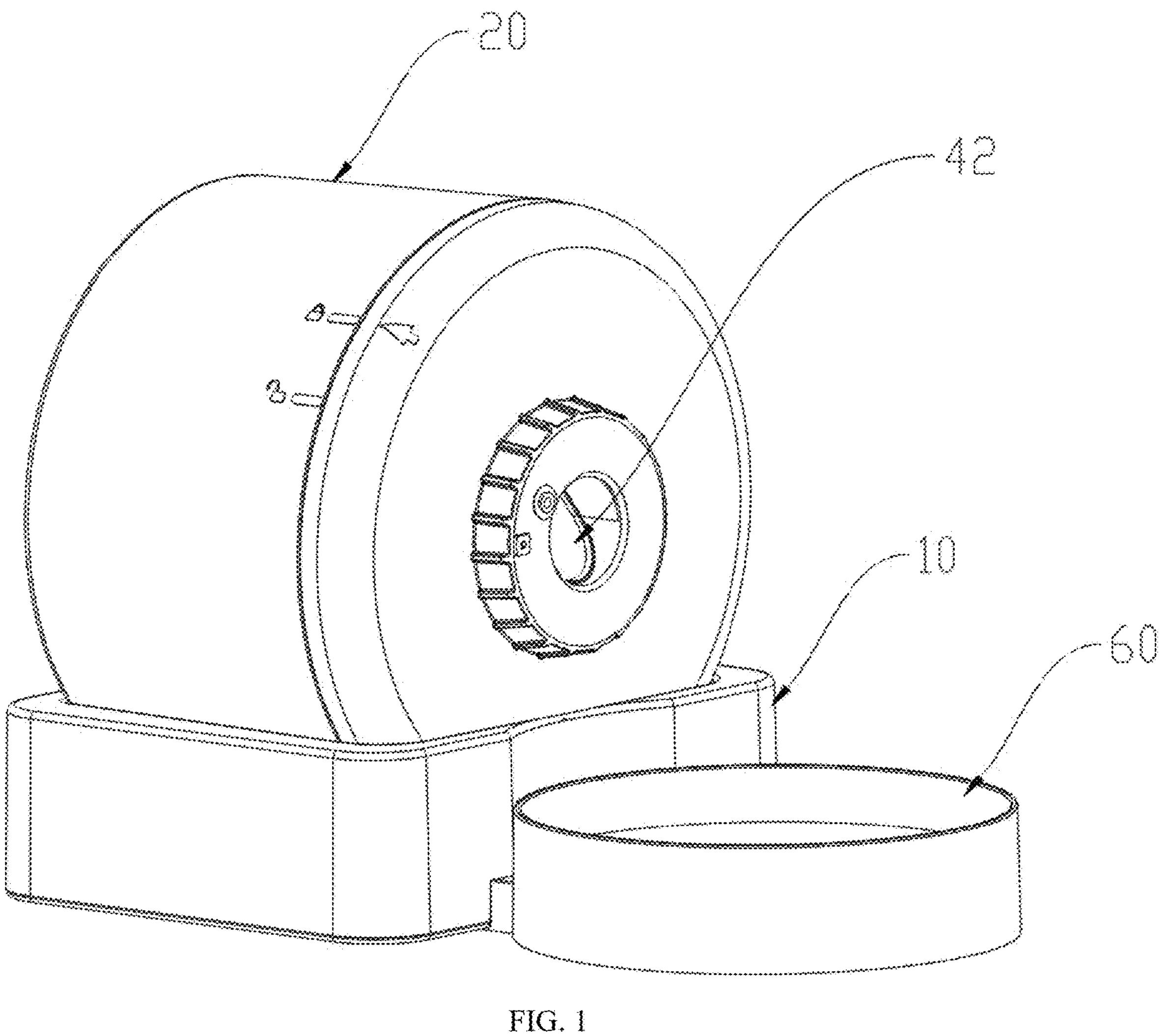
FIG. 1 is a schematic structural diagram (three-dimensional diagram) of one embodiment of a pet feeder provided by the present application.

Reference numerals: 10, base; 20, food tank; 30, driving mechanism; 40, food discharging assembly; 41, food discharging rail; 42, food outlet; 410, sliding portion; 411, guide portion; 400, arc-shaped groove; 50, food collecting flap; 21, first panel; 22, second panel; 23, third panel; 411, first rail member; 412, second rail member; 31, driving motor; 32, linkage assembly; 320, fixing frame; 3211, transmission gear set; 3212, transmission shaft; 3221, transmission wheel; 3222, connecting portion; 3223, limiting portion; 300, meshing tooth structure; 11, base bottom plate; 12, fixing cover; 120, accommodating groove; 100, linkage hole; 60, food bowl; and 13, concave portion.

DETAILED DESCRIPTION OF SOME EMBODIMENTS

In order to make the objectives, technical solutions, and advantages of the present application clearer, the technical solutions in the embodiments of the present application will be described clearly and completely in conjunction with the accompanying drawings. Definitely, the described embodiments are a part of the embodiments of the present application, and not all of the embodiments. All gaseous embodiments that those of ordinary skill in the art can obtain without making any creative efforts based on the embodiments in the present application are included within the scope of the present application.

The meanings of the terms used in the description and the claims correspond to the meanings typically understood by those of ordinary skill in the relevant art of the present application. The terms used in the description and the claims are for the purpose of facilitating the description and understanding of the present application, and are not intended to limit the application to the strict interpretation of the specific terms used in the description and the claims.

As shown in FIG. 1 to FIG. 8, an embodiment of the present application provides a pet feeder, which includes a base 10, a food tank 20 and a driving mechanism 30.

Figure 2:
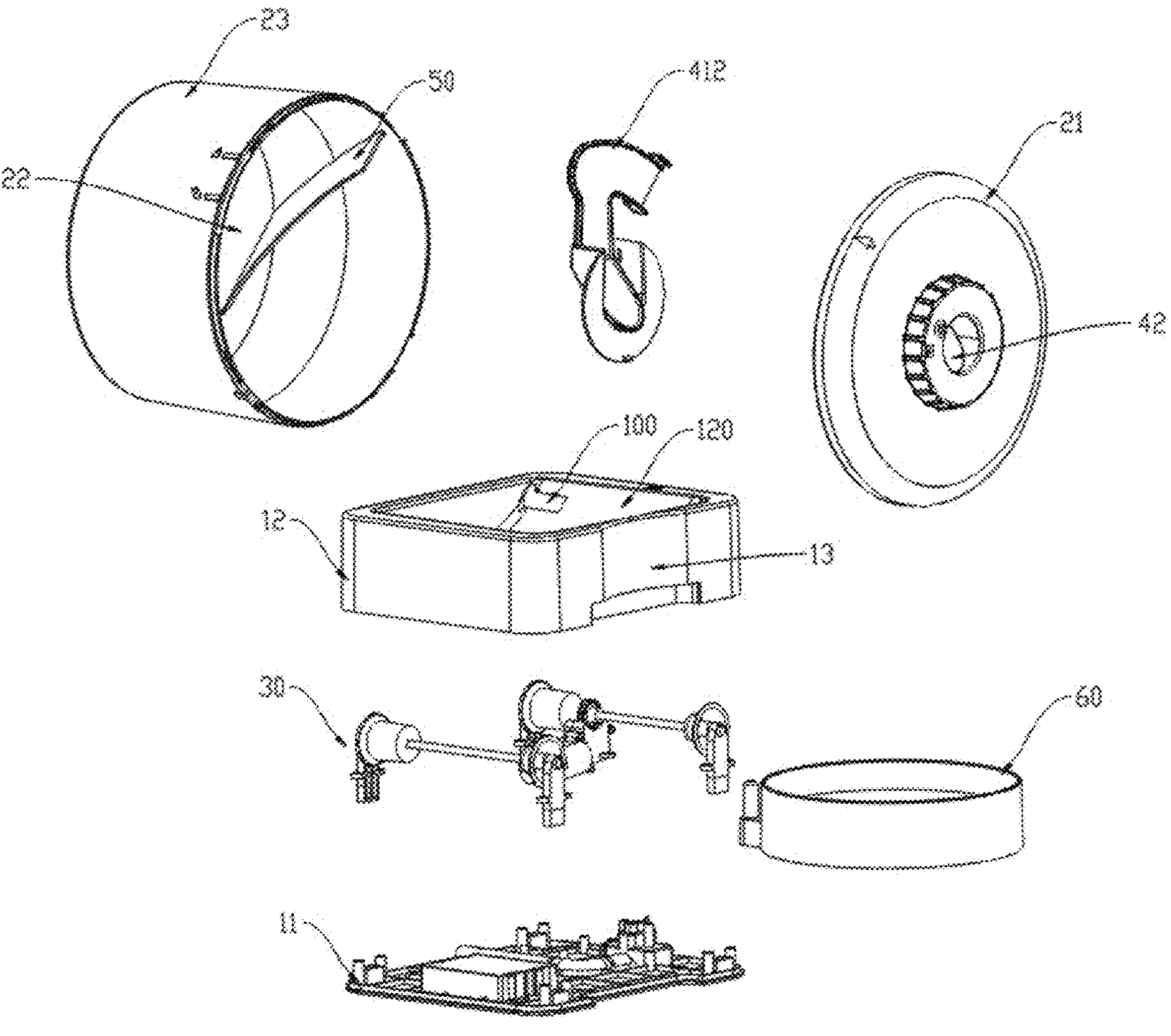
FIG. 2 is a schematic structural diagram (exploded view 1) of one embodiment of a pet feeder provided by the present application.

With reference to FIG. 1 to FIG. 2, the food tank 20 is provided with a cavity for accommodating pet foods; the driving mechanism 30 is fixedly connected to the base 10 and movably connected to an outer circumferential wall of the food tank 20, and is used for supporting the food tank 20 and driving the food tank 20 to rotate; a food discharging assembly 40 is arranged in the food tank 20, and when the driving mechanism 30 drives the food tank 20 to rotate, the pet foods in the food tank 20 can be outputted to the outside of the food tank 20 by the food discharging assembly 40.

It is to be understood that in the above embodiment, the driving mechanism 30 is arranged to drive the food tank 20 to rotate, the rotation of the food tank 20 is accompanied with food output, the food tank 20 rotates with each discharging, thus the pet foods in the food tank 20 can be overturned and mixed with each discharging, which avoids the problems of sticking and caking and unsmooth discharging of the foods at inner top of the food tank 20 of a pet feeder due to long-term standing in the related technology.

With reference to FIG. 2, FIG. 3, FIG. 5 and FIG. 6, further, the food discharging assembly 40 includes a food discharging rail 41 and a food outlet 42 formed in the outer circumferential wall of the food tank 20, two ends of the food discharging rail 41 are in communication with the food outlet 42 and a cavity in the food tank 20 respectively, namely, the interior of the food tank 20 communicates with the outside of the food tank 20 through the food outlet 42 and the food discharging rail 41.

By the food discharging rail 41, the foods in the food tank 20 can enter the food outlet 42 in order through the food discharging rail 41 and is finally outputted to the outside of the food tank 20 through the food outlet 42; in this solution, the food discharging rail 41 is arranged to be an accommodating cavity having a fixed volume; as the food tank 20 rotates, the pet foods in the food tank 20 will enter the food discharging rail 41, and because the internal volume of the food discharging rail 41 is fixed, the amount of the foods discharged each time can be controlled by controlling the volume of the food discharging rail 41 or controlling the rotation speed of the food tank 20, thus achieving the effect of orderly and quantitative feeding.

With reference to FIG. 2 to FIG. 6, further, as a preferred embodiment of the present application, the food discharging rail 41 includes a sliding portion 410 that is connected to the food outlet 42 and a guide portion 411 that is connected to the other end of the sliding portion 410; and an opening communicating with the cavity in the food tank 20 is formed in the end, away from the sliding portion 410, of the guide portion 411. The guide portion 411 can effectively guide the foods in the food tank 20 to enter inside, and the sliding portion 410 is beneficial for the foods in the guide portion 411 to be smoothly outputted to the outside of the food tank 20 through the food outlet 42.

Further, an included angle formed between the guide portion 411 and the sliding portion 410 is not larger than 90°.

When the food tank 20 rotates, the foods in the food tank 20 will be overturned and rolled and enter the guide portion 411 through the opening of the guide portion 411; and because the included angle formed between the guide portion 411 and the sliding portion 410 is not larger than 90°, the foods entering the guide portion 411 will be be blocked at the included angle, thus the volume of the foods entering the food discharging rail 41 each time will be controlled, and the purpose of quantitative discharging is achieved.

Figure 5:
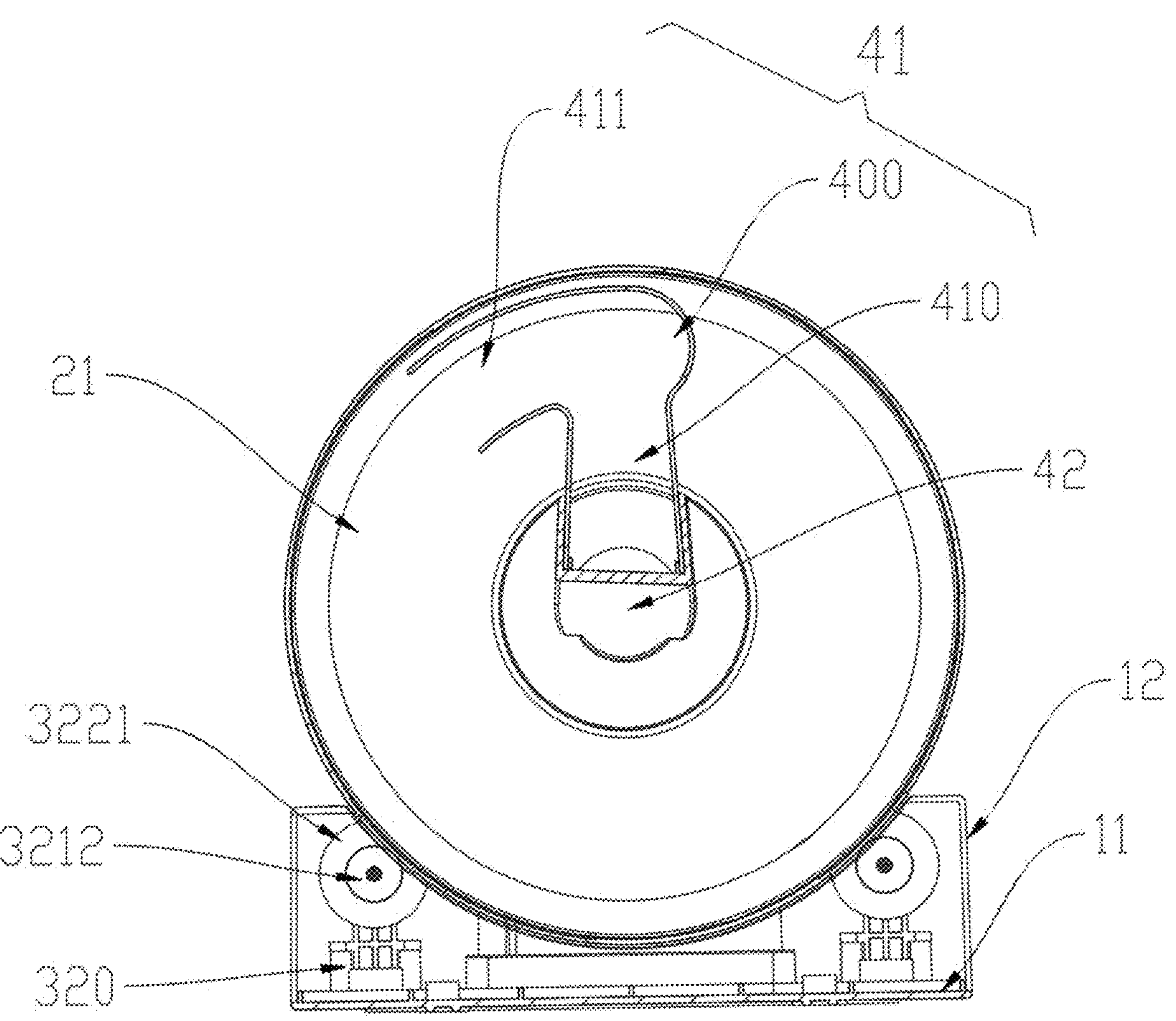
FIG. 5 is a section view (sectioning direction 1) of one embodiment of a pet feeder provided by the present application.

With reference to FIG. 5, by way of example, an arc-shaped groove 400 is formed in the joint of the guide portion 411 and the sliding portion 410 and can be used for temporarily accommodating the foods; and the amount of foods discharged each time can be controlled by adjusting the size and radian of the arc-shaped groove 400. In addition, the amount of foods discharged each time can also be controlled by adjusting the width, the length and the like of the guide portion 411.

In other embodiments, a square groove or a groove body in other shapes can be formed in the joint of the guide portion 411 and the sliding portion 410.

Figure 6:
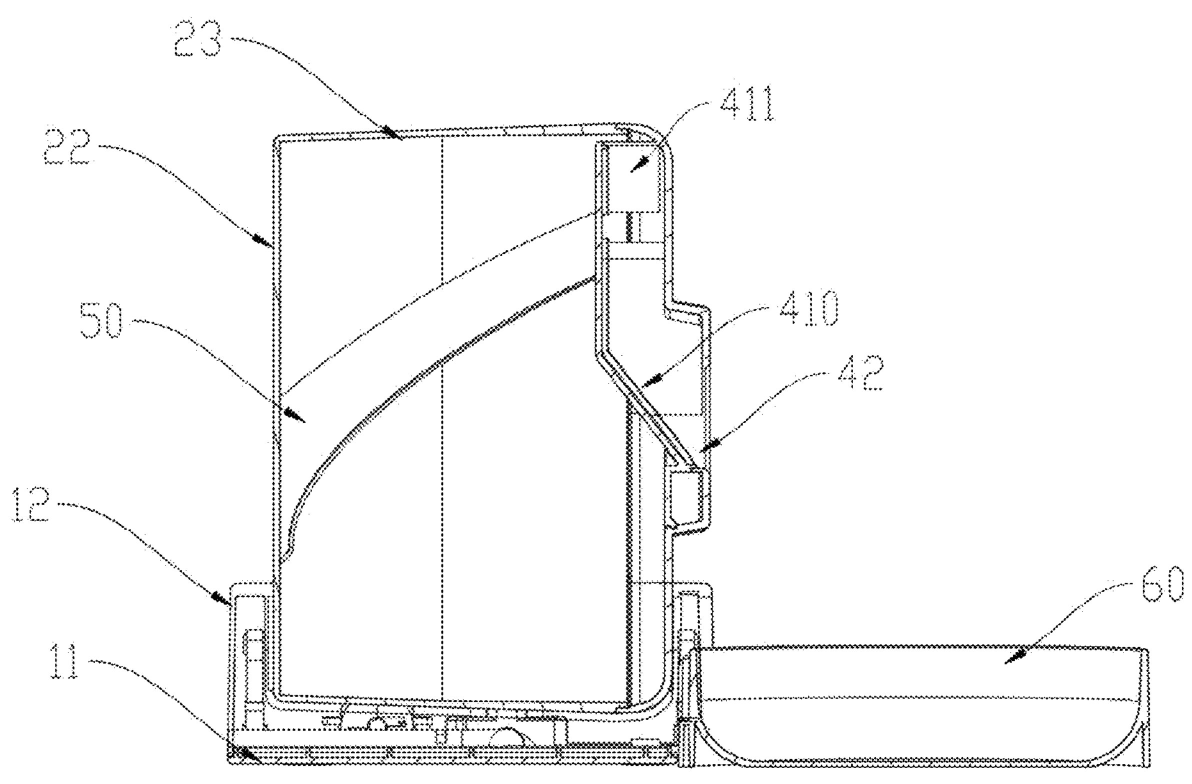
FIG. 6 is a section view (sectioning direction 1) of one embodiment of a pet feeder provided by the present application.

With reference to FIG. 2 and FIG. 6, further, the pet feeder further includes a food collecting flap 50 which is fixed to the inner circumferential wall of the food tank 20, and one end of the food collecting flap 50 is close to the opening of the guide portion 411. When the food tank 20 rotates, the foods in the food tank 20 will be overturned and rolled in the food tank 20, the food collecting flap 50 can play the effects of interception and centralized guide, and therefore the foods falling on the food collecting flap 50 after overturning and rolling can be guided to the opening of the guide portion 411 of the food discharging rail 41 by the food collecting flap 50 and then enters the guide portion 411 as the food tank 20 continuously moves. In addition, when the food tank 20 rotates, the food collecting flap 50 can also play a certain impact effect on the foods in overturning and rolling in the food tank 20; and in case of slightly sticking, the foods in the food tank 20 can be impacted and separated in this process, thereby avoiding the problem of food sticking and caking. By way of example, some users will add lyophilized powder in the grain storage, and the addition of lyophilized powder further increases the likelihood of sticking of the pet foods; because the foods in the food tank 20 of the pet feeder provided by the present application are overturned and roll with each discharging, and in combination with the food collecting flap 50, this problem can be effectively solved, the pet foods in the food tank 20 can be impacted and separated with each discharging, and finally the effect of even and smooth food discharging can be achieved.

Figure 3:
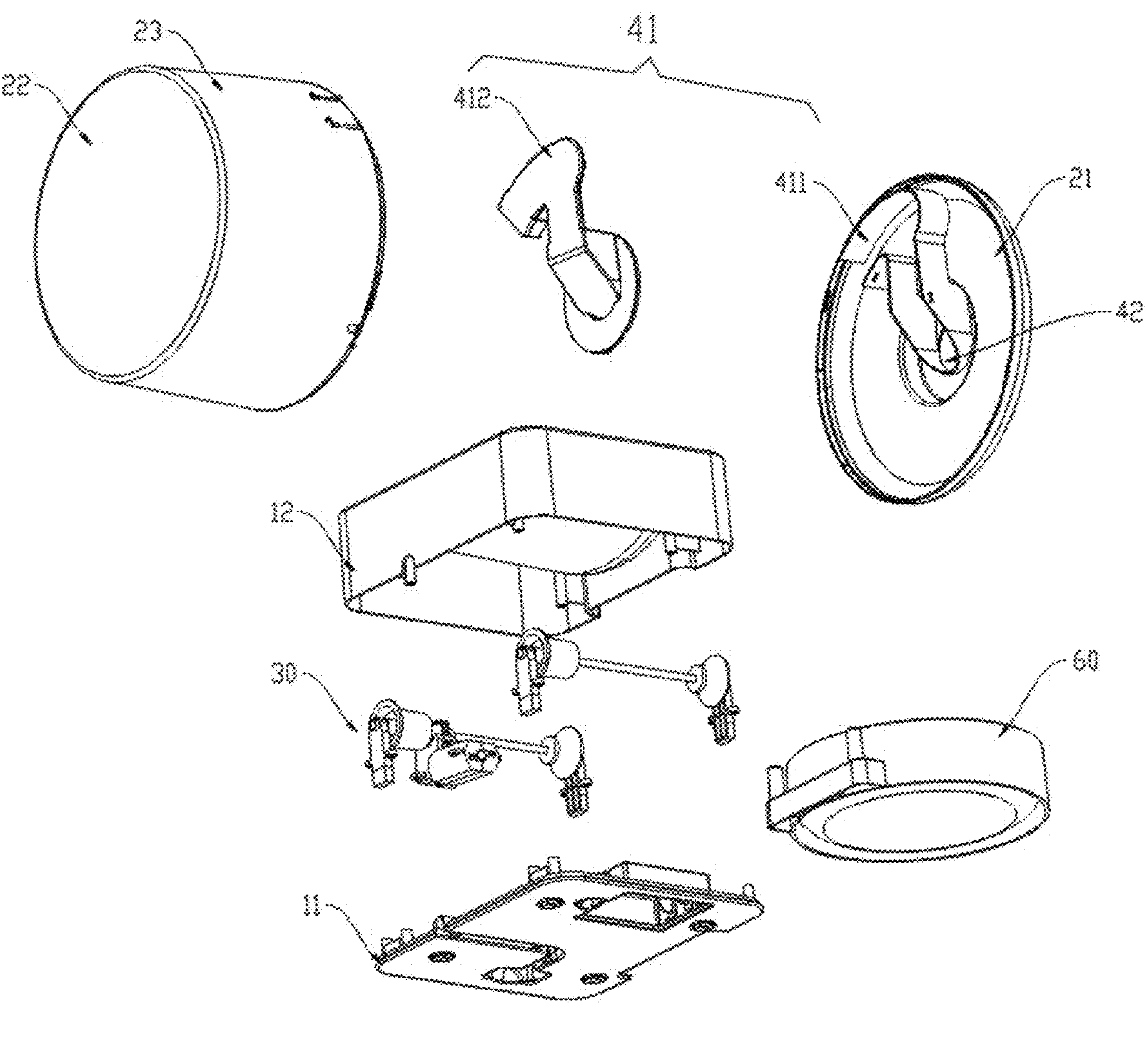
FIG. 3 is a schematic structural diagram (exploded view 2) of one embodiment of a pet feeder provided by the present application.

With reference to FIG. 1 to FIG. 3, further, the food tank 20 includes a first panel 21 and a second panel 22 which are oppositely arranged, and a third panel 23 which fixedly connects the first panel 21 with the second panel 22; the third panel 23 is arranged to be of a hollow cylindrical structure with two ends opened; and the first panel 21, the second panel 22 and the third panel 23 are assembled to jointly form a hollow cylinder structure.

With reference to FIG. 1 to FIG. 3, the food discharging assembly 40 is fixedly connected to the first panel 21, and the food outlet 42 is formed in the first panel 21; and one end of the food collecting flap 50 is fixedly connected to the second panel 22, the other end thereof is formed by extending the second panel 22 towards the first panel 21, and the other end of the food collecting flap 50 is close to the opening of the guide portion 411.

With reference to FIG. 2 and FIG. 6, further, the food collecting flap 50 is fixedly connected to the third panel 23. By way of example, the food collecting flap 50 is of a strip-shaped sheet structure; the edge of the side, close to the third panel 23, of the food collecting flap 50 in the length direction is fixedly connected to the third panel 23, so that the two ends of the food collecting flap 50 face the first panel 21 and the second panel 22 respectively; and the end, close to the first panel 21, of the food collecting flap 50 is suspended and is adjacent to the opening of the guide portion 411, and the other end of the food collecting flap 50 is fixedly connected to the second panel 22. When the food tank 20 is driven by the driving mechanism 30 to roll and rotate, the foods in the food tank 20 will move due to gravity and will be overturned and stirred like a cement mixer and a drum washing machine, thus the foods in the food tank 20 can be loosened and mixed, and the problem of sticking and caking can be avoided. Further, due to the shape of the food collecting flap 50, and because the food collecting flap 50 is fixed to the third panel 23 and extends towards the first panel 21 and the second panel 22 at two ends, the foods in rolling and stirring by gravity can be effectively borne by the food collecting flap 50, and a certain impact will be performed on the foods, thus further improving the effect of separating the stunk foods and centrally guiding to the guide portion 411.

With reference to FIG. 2 to FIG. 3, further, the food discharging rail 41 is defined by a first rail member 411, a second rail member 412 and the inner wall of the food tank 20. By way of example, the first rail member 411 is fixedly connected to the side, facing the interior of the food tank 20, of the first panel 21; and the second rail member 412 and the first rail member 411 are fixedly packaged. Compared with a mode that an enclosed rail is independently arranged in the food tank 20, the above arrangement has the advantages that the inner wall of the food tank 20 is fully utilized, and thus materials are saved; moreover, when there are few foods in the food tank 20, because one inner wall of the food discharging rail 41 is the inner wall of the food tank 20, namely, there is no drop between the opening of the food discharging rail 41 and the inner wall of the food tank 20, the foods in the food tank 20 can enter the food discharging rail 41 more smoothly. In addition, the first rail member 411 and the second rail member 412 can be connected in an interference fit or screw mode, which facilitates the user to conveniently disassemble the first rail member 411 and the second rail member 412 for cleaning after using for a certain time, thereby avoiding the problems that the foods remain in an integrated rail and are inconvenient to clean.

Figure 4:
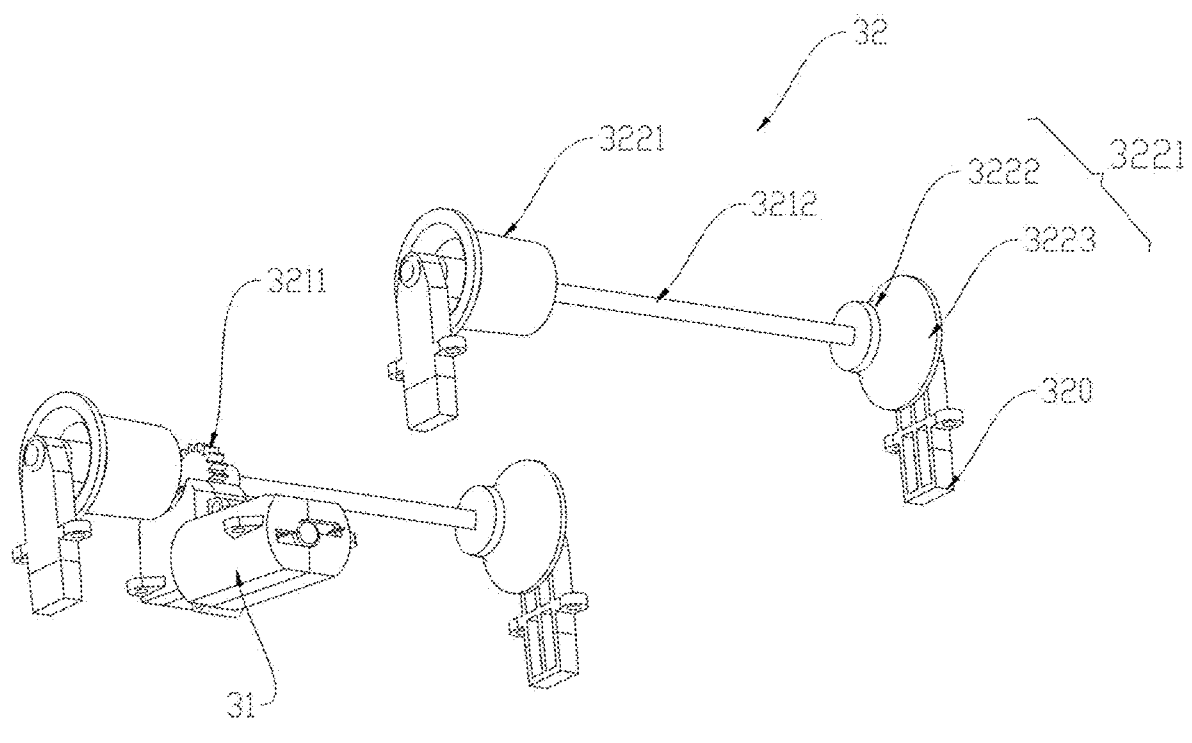
FIG. 4 is a schematic structural diagram of a driving mechanism in a pet feeder provided by the present application.

With reference to FIG. 2 to FIG. 4, further, the driving mechanism 30 includes a driving motor 31 and a linkage assembly 32, in which, the food tank 20 is movably connected to the linkage assembly 32, and the driving motor 31 drives the linkage assembly 32 to rotate the food tank 20 that is movably connected to the linkage assembly 32.

With reference to FIG. 2 to FIG. 5, further, the linkage assembly 32 includes a fixing frame 320 that is fixedly connected to the base 10, and a first transmission member and a second transmission member which are arranged on the fixing frame 320; the first transmission member is connected to the driving motor 31, and the second transmission member is synchronously connected to the first transmission member and the outer circumferential wall of the food tank 20; and the driving motor 31 drives the food tank 20 to rotate by the first transmission member and the second transmission member.

With reference to FIG. 2 to FIG. 5, further, the first transmission member includes a transmission gear set 3211 that is connected to an output shaft of the driving motor 31, and a transmission shaft 3212 that is fixedly connected to the transmission gear set 3211; the second transmission member sleeves the transmission shaft 3212 in a fixed connection way; and the outer circumferential wall of the food tank 20 is movably connected to the second transmission member. When the driving motor 31 works, the transmission gear set 3211 connected to the output shaft of the driving motor 31 runs and drives the transmission shaft 3212 that is fixedly connected to the transmission gear set 3211 to axially rotate along its own axis, and further drives the second transmission member that is fixedly connected to the transmission shaft 3212 to rotate in the axial direction of the transmission shaft 3212.

By way of example, two sets of linkage assemblies 32 are arranged in parallel and symmetrically.

With reference to FIG. 2 to FIG. 5, further, the second transmission member includes at least two oppositely-arranged transmission wheels 3221, and the transmission wheels 3221 sleeve the transmission shaft 3212 and can rotate along with the transmission shaft 3212; and the food tank 20 is movably connected to the transmission wheels 3221.

With reference to FIG. 2 to FIG. 5, further, each transmission wheel 3221 is provided with a connecting portion 3222 that abuts against the outer circumferential wall of the food tank 20, and a limiting portion 3223 that is connected to the outer side of the connecting portion 3222. The limiting portions 3223 can limit the food tank 20 to prevent the food tank 20 from disengaging from the transmission wheels 3221 after rotating.

With reference to FIG. 2 to FIG. 5, further, the diameter of the connecting portions 3222 is less than that of the limiting portions 3223. In combination with the arrangement of the two sets of linkage assemblies 32, it is to be understood that when the food tank 20 makes contact with the transmission wheels 3221, the limiting portions 3223, which are on the outer side and have the diameter greater than the connecting portions 3222 on the inner side, are both located on the outer side of the food tank 20, which can further improve the limiting effect, thereby effectively preventing the food tank 20 from disengaging.

With reference to FIG. 2 to FIG. 5, further, the outer circumferential wall of the food tank 20 is in friction transmission connection with the transmission wheels 3221. The outer circumferential wall of the food tank 20 is abutted against the connecting portions 3222, namely, when the food tank 20 is stood, the connecting portions 3222 support the food tank 20; and when the driving motor 31 works and drives the transmission wheels 3221 to rotate, friction transmission is formed between the food tank 20 and the connecting portions 3222 due to the friction force between the food tank 20 and the connecting portions 3222, thereby driving the food tank 20 to rotate.

Figure 7:
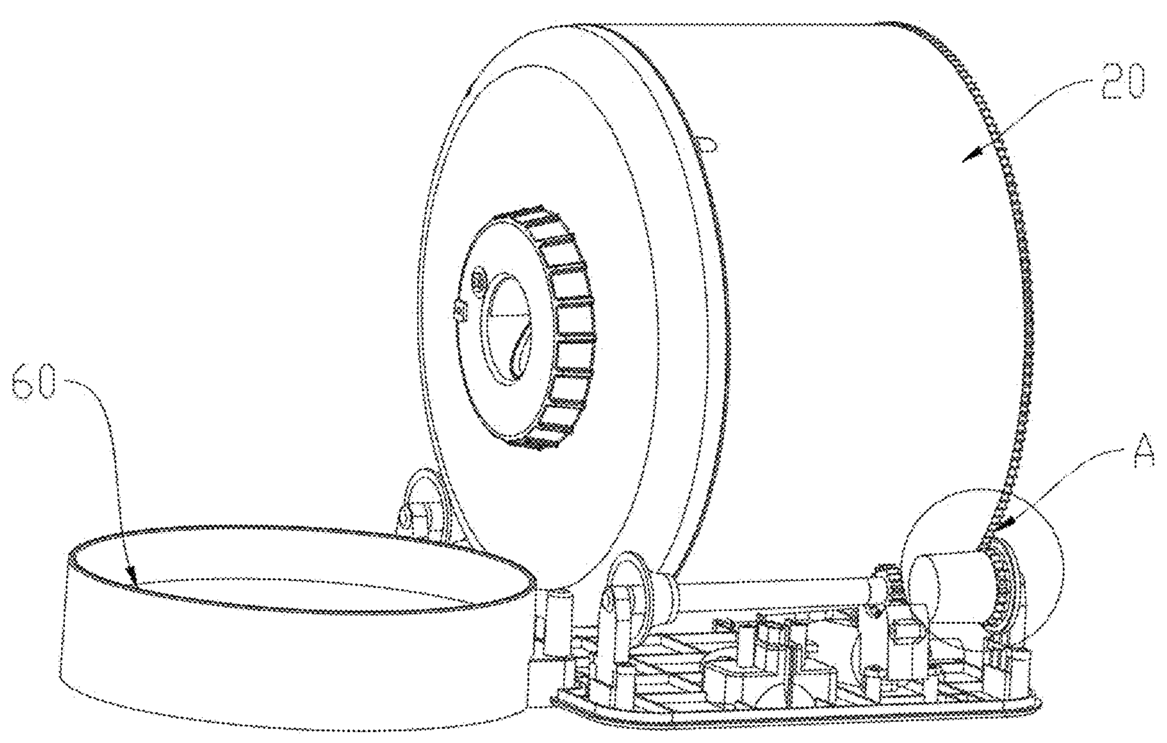
FIG. 7 is a schematic structural diagram of another embodiment of a pet feeder provided by the present application.
Figure 8:
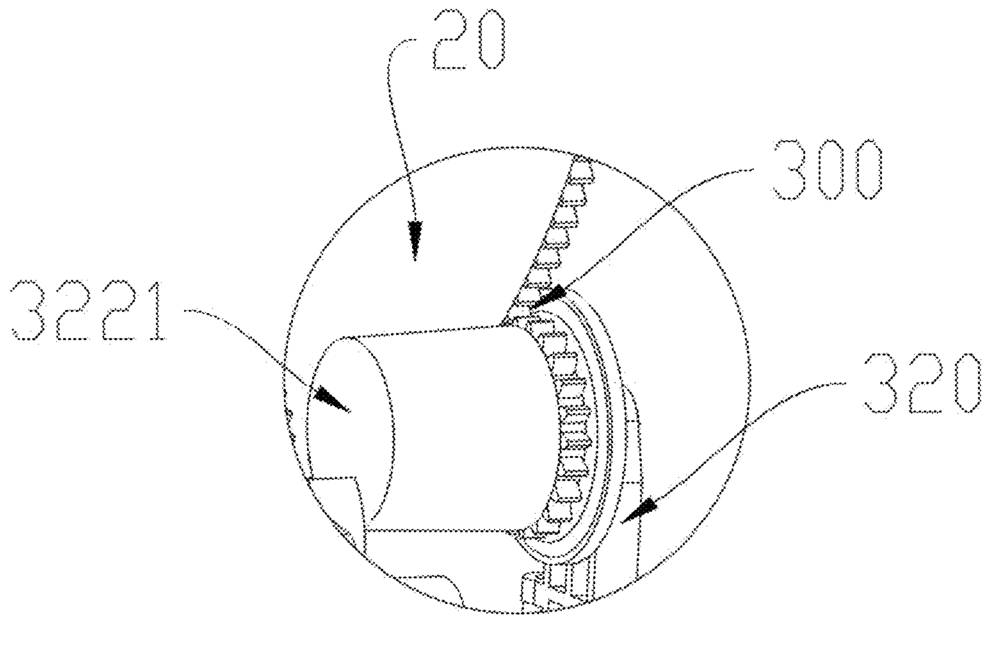
FIG. 8 is a partial enlarged diagram of a part A in FIG. 7.

With reference to FIG. 7 to FIG. 8, further, meshing tooth structures 300 matched with the transmission wheels 3221 are arranged on the outer circumferential wall of the food tank 20. The meshing tooth structures 300 can improve the load capacity of the driving assembly for the food tank 20, and can further improve the driving force for the food tank 20. By way of example, the meshing tooth structures 300 are arranged on the transmission wheel 3221 far away from the first panel 21 and particularly located on the limiting portion 3223 of the transmission wheel 3221.

With reference to FIG. 1 to FIG. 8, further, the base 10 includes a base bottom plate 11, and a fixing cover 12 which packages the top of the base bottom plate 11; an accommodating space for accommodating the driving mechanism 30 is defined by the base bottom plate 11 and the fixing cover 12; and an accommodating groove 120 which is sunken towards the base bottom plate 11 is formed in the top of the fixing cover 12 and matched with the outer edge of the bottom of the food tank 20.

With reference to FIG. 2, further, a linkage hole 100 is formed in the accommodating groove 120 and corresponds to the transmission wheels 3221; and after the fixing cover 12 packages the base bottom plate 11, the transmission wheels 3221 partially protrudes out of the linkage hole 100, thus when the food tank 20 is located in the accommodating groove 120, the transmission wheels 3221 can abut against the food tank 20. That is, when the food tank 20 is placed in the accommodating groove 120, the bottom of the food tank 20 abuts against the transmission wheels 3221 that protrude out of the linkage hole 100; and when the driving motor 31 works and drives the transmission wheels 3221 to rotate, the food tank 20 abutting against the transmission wheel 3221 will rotate due to friction transmission. It is to be understood that compared with a pet feeder capable of automatically discharging foods in the related technology, the pet feeder provided by the present application is simple in structure and high in internal space utilization rate, and the production material consumption of the whole product is effectively reduced; in addition, it can be known from the above structure that the pet feeder is convenient to assemble, and few in assembling procedures, so that the production efficiency is improved; and in the present application, the pet feeder having the two advantages achieves the beneficial effect of low production cost.

With reference to FIG. 1 to FIG. 8, further, the pet feeder includes a food bowl 60 which is arranged adjacent to the base 10, and an opening of the food bowl 60 is below the food outlet 42.

Further, a concave portion 13 matched with the outer edge of the food bowl 60 by radian is arranged on the side, facing the food bowl 60, of the base 10, and the food bowl 60 is embedded in the concave portion 13. By means of this arrangement, the overall space utilization rate of the feeder can be increased, the food tank 20 is matched compactly with the food bowl 60 and the base 10, which is conducive to the stability of the overall structure assembly of the pet feeder, also can effectively reduce the overall space occupation rate of the pet feeder, and provides a larger activity space for a pet.

In conclusion, the pet feeder provided by the present application is simple in structure and high in space utilization rate; when in use, the food tank is taken out of the base, a proper amount of foods can be added into the food tank, and then the food tank is covered with the cover and placed on the base. When in use, the pet feeder also has a certain dynamic effect, which provides certain entertainment for the pet, and improves the enjoyment of feeding the pet.

Finally, it is to be noted that the above provides a detailed explanation of the specific embodiments of the present application. The above-mentioned embodiments disclosed in the present application are only preferred embodiments of the present application. For those of ordinary skill in the art, many variations and improvements can be made without departing from the spirit of the present application. These variations and improvements are all within the scope of protection defined by the claims of the present application.

What is claimed is:

1. A pet feeder, comprising:

a base;

a food tank having a cavity for accommodating pet foods; and a driving mechanism which is fixedly connected to the base and movably connected to an outer circumferential wall of the food tank, and is used for supporting the food tank and driving the food tank to rotate;

a food discharging assembly is arranged in the food tank; and the food discharging assembly is configured to output pet foods in the food tank to an outside of the food tank when the driving mechanism drives the food tank to rotate;

wherein the driving mechanism comprises a driving motor and a linkage assembly, the food tank is movably connected to the linkage assembly, and the driving motor drives the linkage assembly to rotate the food tank; and wherein the linkage assembly comprises a fixing frame fixedly connected to the base, and a first transmission member and a second transmission member arranged on the fixing frame, the first transmission member is connected to the driving motor, and the second transmission member is synchronously connected to the first transmission member and the outer circumferential wall of the food tank, such that the driving motor drives the food tank to rotate by the first transmission member and the second transmission member.

2. The pet feeder according to claim 1, wherein the food discharging assembly comprises a food discharging rail and a food outlet formed in the outer circumferential wall of the food tank, and an interior of the food tank communicates with an exterior of the food tank through the food outlet and the food discharging rail.

3. The pet feeder according to claim 2, wherein the food discharging rail comprises:

a sliding portion having a first end connected to the food outlet and a second end opposite to the first end; and a guide portion having a third end connected to the second end of the sliding portion, and a fourth end opposite to the third end; wherein an opening communicating with the cavity in the food tank is formed in the fourth end of the guide portion.

4. The pet feeder according to claim 3, wherein an included angle formed between the guide portion and the sliding portion is not larger than 90°.

5. The pet feeder according to claim 4, further comprising a food collecting flap, wherein the food collecting flap is fixed to the inner circumferential wall of the food tank, and one end of the food collecting flap is close to the opening of the guide portion.

6. The pet feeder according to claim 5, wherein the food tank comprises a first panel and a second panel which are oppositely arranged, and a third panel which fixedly connects the first panel with the second panel; and the third panel is configured to be of a hollow cylindrical structure with two ends opened;

the food discharging assembly is fixedly connected to the first panel, and the food outlet is formed in the first panel; and one end of the food collecting flap is fixedly connected to the second panel, the other end of the food collecting flap is formed by extending the second panel towards the first panel, and the other end of the food collecting flap is close to the opening of the guide portion.

7. The pet feeder according to claim 6, wherein the food collecting flap is fixedly connected to the third panel.

8. The pet feeder according to claim 2, wherein the food discharging rail is defined by a first rail member, a second rail member and the inner wall of the food tank.

9. The pet feeder according to claim 1, wherein the first transmission member comprises a transmission gear set connected to an output shaft of the driving motor and a transmission shaft fixedly connected to the transmission gear set.

10. The pet feeder according to claim 9, wherein the second transmission member is sleeved on the transmission shaft and fixedly connected to the transmission shaft.

11. The pet feeder according to claim 10, wherein the outer circumferential wall of the food tank is movably connected to the second transmission member.

12. The pet feeder according to claim 11, wherein the second transmission member comprises at least two oppositely-arranged transmission wheels which sleeve the transmission shaft and can rotate along with the transmission shaft; and the food tank is movably connected to the transmission wheels.

13. The pet feeder according to claim 12, wherein each transmission wheel is provided with a connecting portion that abuts against the outer circumferential wall of the food tank, and a limiting portion that is connected to the outer side of the connecting portion.

14. The pet feeder according to claim 13, wherein the diameter of the connecting portions is less than that of the limiting portions.

15. The pet feeder according to claim 12, wherein the outer circumferential wall of the food tank is in friction transmission connection with the transmission wheels.

16. The pet feeder according to claim 12, wherein the outer circumferential wall of the food tank is provided with meshing tooth structures which are matched the transmission wheels.

17. The pet feeder according to claim 12, wherein the base comprises a base bottom plate and a fixing cover which packages the top of the base bottom plate, and an accommodating space used for accommodating the driving mechanism is defined by the base bottom plate and the fixing cover; and an accommodating groove that is sunken towards the base bottom plate is formed in the top of the fixing cover, and the accommodating groove is configured to be matched with an outer edge of the bottom of the food tank.

18. The pet feeder according to claim 17, wherein a linkage hole is formed in the accommodating groove and corresponds to the transmission wheels; and after the fixing cover packages the base bottom plate, of a portion of each transmission wheel protrudes outward from the linkage hole so as to make the transmission wheels abut against the food tank when the food tank is in the accommodating groove.

19. The pet feeder according to claim 2, further comprising a food bowl which is arranged adjacent to the base, wherein an opening of the food bowl is located below the food outlet.

20. The pet feeder according to claim 19, wherein a concave portion matched with outer edge of the food bowl by radian is arranged on the side, facing the food bowl, of the base, and the food bowl is embedded in the concave portion.

* * * * *